June 21, 1960

D. L. LORENZ 2,941,473

COUPLING APPARATUS FOR A MULTIPLE UNIT FUEL PUMP

Filed May 17, 1955

INVENTOR.
DONALD L. LORENZ
BY
ATTORNEYS

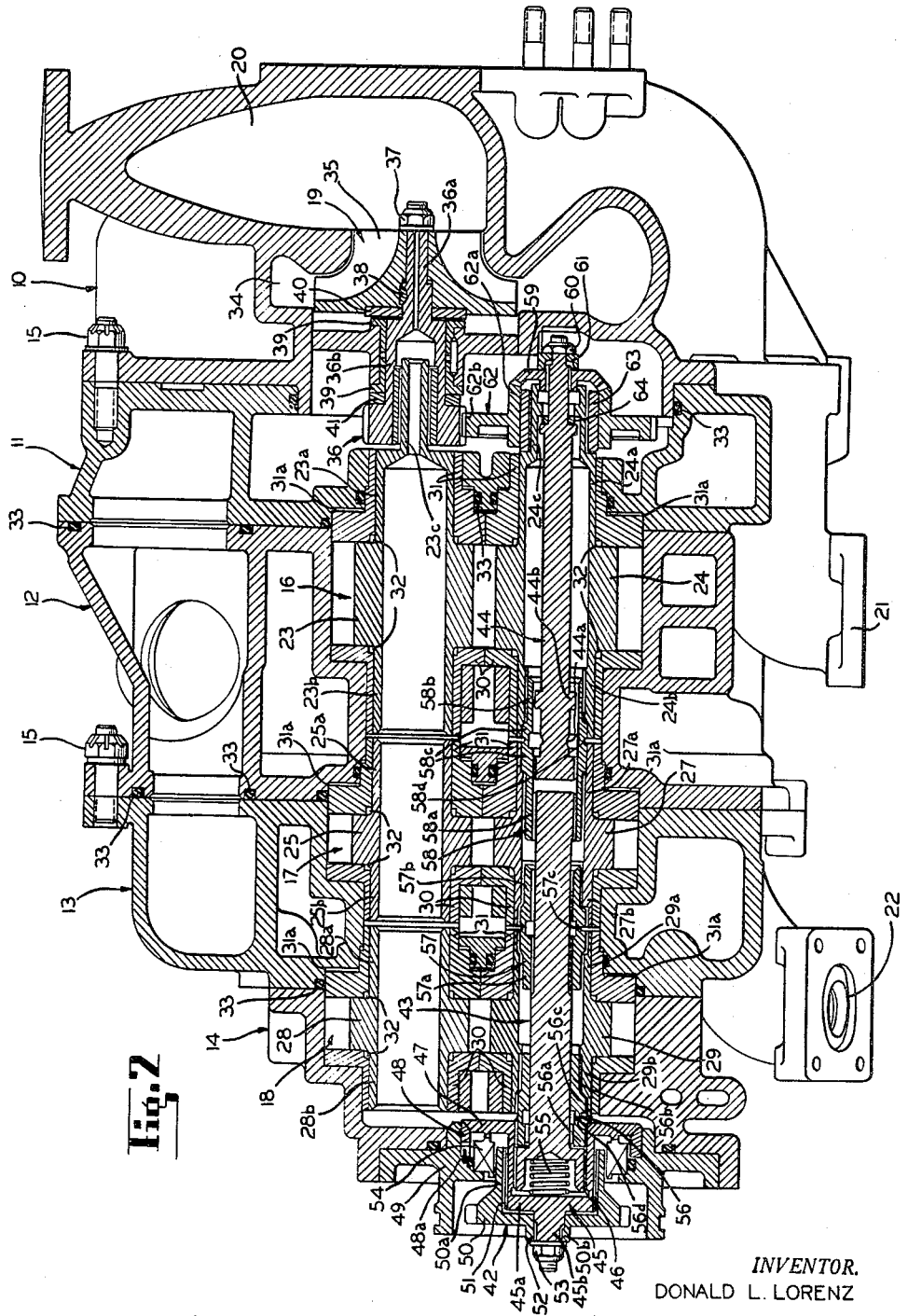

2,941,473

United States Patent Office

Patented June 21, 1960

2,941,473

COUPLING APPARATUS FOR A MULTIPLE UNIT FUEL PUMP

Donald L. Lorenz, Euclid, Ohio, assignor to Thompson Ramo Wooldridge Inc., a corporation of Ohio Filed May 17, 1955, Ser. No. 508,991

5 Claims. (Cl. 103—4)

This invention relates to a fluid displacement apparatus having a plurality of pumps, and more particularly to a multiple pumping unit including a plurality of pumps powered from a common drive means in such a manner that one or more pumps may discontinue operation without interrupting the operation of the remaining pumps.

The present invention is highly desirable when employed in connection with the supply of a vital fluid to a particularly strategic location where it is necessary that an uninterrupted flow of fluid be provided, for example, in supplying fuel to aircraft engines, such as jet engines, although other uses may be apparent to one skilled in the art. Obviously, the interrupted fuel supply in a jet aircraft would be hazardous to the operator of the aircraft and to the possible loss or damage of the aircraft itself.

In accordance with this invention, a plurality of pressure loaded gear pumps in series with a centrifugal pump have a common drive means. A frangible or yieldable means interconnects the drive means with each pump so that binding, seizing, or other abnormal loading of one or more pumping units will cause a corresponding frangible means or shear section to yield, while permitting normal uninterrupted operation of the other pumps and their corresponding frangible means.

It is then an object of this invention to provide a fluid displacement apparatus having a multiplicity of pumping units wherein a continuous fluid flow will be maintained despite the discontinued operation of one or more pumping units.

A further object of this invention is to provide a fluid displacement apparatus having a common drive means for supplying power to a plurality of pumping units, and yielding means interconnecting the common drive means to each pumping unit affording protection to a pump abnormally loaded by binding or siezing thereof and permitting uninterrupted operation of the other pumps.

A still further object of this invention resides in the provision of a multiple pump having a plurality of pressure loaded gear pumps and a common drive means interconnected with the pumps by means of separate frangible or yieldable couplings, wherein the stoppage of one or more pumps due to abnormal loading will not interrupt the operation of the other pumps.

Another object of this invention is in the provision of a common drive means interconnected to a plurality of fluid pumps in a multi-pump apparatus through separate yieldable couplings, wherein the yielding of one or more couplings due to abnormal loading of one or more corresponding pumps allows the remaining pumps with non-yielded couplings to provide an uninterrupted fluid flow from the multiple pump.

Still another object of this invention resides in the provision of a multi-pump apparatus having a plurality of pressure loaded gear pumps connected in parallel, a centrifugal pump connected in series with the gear pumps, a common drive means for all of the pumps including a pair of coupled and axially aligned shafts, one of the shafts having a yieldable section and leading to the centrifugal pump while the other shaft is connected to the gear pumps through separate yieldable coupling members, wherein the yielding of the centrifugal pump driving shaft section or a yieldable coupling member due to abnormal loading of a corresponding pump permits the uninterrupted operation of the remaining pumps.

Another features of this invention is to provide a frangible coupling for a multiple pump common drive having means for limiting the movement of the coupling or coupling pieces should they break during operation thereof.

A further object of this invention is to provide a pumping apparatus having a plurality of pumps and a common drive means for the pumps including a pair of axially aligned shafts, wherein a frangible coupling member is provided to couple the adjacent ends of the shaft and drive a pump having means for coacting with the pumps to bearingly support the adjacent ends of the shafts.

Another object of this invention is to provide frangible coupling members for a multi-pump having an input end connected to a power member and separated from an output end connected to a pump by a yieldable section, wherein means is provided on the input and output ends of the coupling to cooperate with the pumps in limiting the relative movement therebetween in case the yieldable section yields.

Other objects, features and advantages of the invention will be apparent from the following detailed description of the drawings which, by way of a preferred example only, illustrates the invention, and wherein like reference numerals refer to like parts in the various views.

On the drawings:

Figure 2 is an axial sectional view taken substantially along line II—II of Figure 1.

As shown on the drawings:

The present invention is primarily contemplated for use in supplying fuel at high pressures in jet aircraft equipped with an afterburner assembly, wherein fuel may be simultaneously supplied from a single fluid displacement apparatus to a main burner and an afterburner, although other uses and purposes will be apparent to one skilled in the art.

Figure 1:
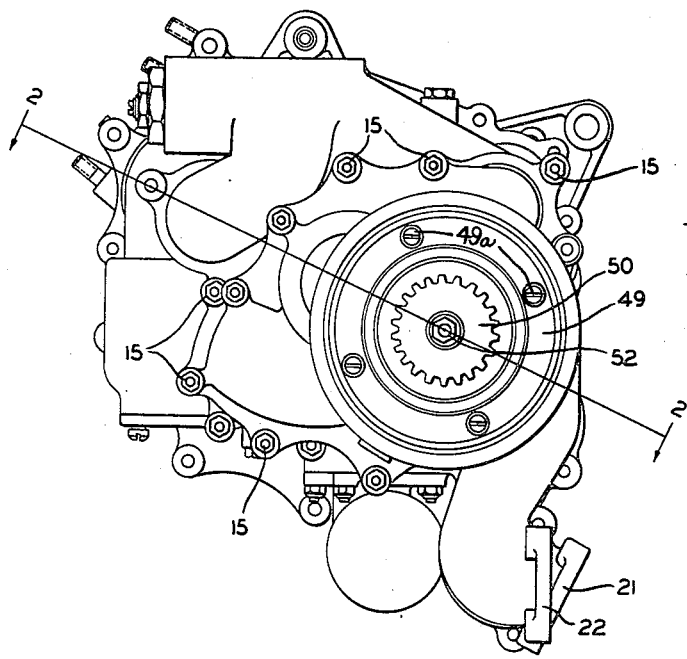
Figure 1 is a rear end elevational view of a multiple pump apparatus in accordance with the principles of the invention.

The multiple pump structure of the present invention includes a multi-section housing or casing comprising an inlet or front section 10, a first intermediate section 11, a second intermediate section 12, a third intermediate section 13, and a rear or power input section 14. The several housing sections are rigidly united to constitute the pump housing by means of suitable fasteners, such as studs, a plain washer and a castellated nut, as indicated by the numerals 15 as seen in Figures 1 and 2.

In general, a plurality of coaxially aligned and spaced pumping cavities or chambers, three in this instance, are provided within the multi-section housing to receive pressure loaded gear pumps including a large main burner gear pump 16, and a pair of substantially smaller afterburner gear pumps 17 and 18. Another pumping cavity or housing is located in the inlet or front section of the housing to receive a centrifugal pump 19. The gear pumps are connected in series with the centrifugal pump.

The front housing section includes an inlet 20 which receives fluid, such as fuel from a fuel supply tank (not shown), and delivers same to the centrifugal pump 19 which in turn distributes the fuel at a high pressure to the various gear pumps. As seen most clearly in Figure 2, an outlet 21 provided for the main pump and an outlet 22 is provided for the afterburner or emergency pumps, but it is to be understood that the fuel flow from the afterburner pumps 17 and 18 may be diverted to the main pump outlet 21 as will be hereinafter explained.

The centrifugal pump 19 is provided to deliver pressurized fuel to the pressure loaded gear pumps, thereby substantially reducing inlet losses in the gear pumps. Hence, the serviceability and life of the gear pumps are greatly enhanced and a marked increase in efficiency in the pumps is obtained. Each gear pump includes a pair of axially hollowed rotary intermeshing gears such as a driven gear 23 and a driving gear 24 for pump 16, a driven gear 25 and a driving gear 27 for pump 17, and a driven gear 28 and a driving gear 29 for pump 18. The driven gears 23, 25 and 28 carry oppositely extending supporting shafts 23a and 23b, 25a and 25b, and 28a and 28b, respectively; while the driving gears 24, 27 and 29 carrying integral and oppositely extending supporting shafts 24a and 24b, 27a and 27b, and 29a and 29b, respectively.

One end of each driving and driven gear is journaled in a stationary bushing 30, which also functions to provide a side seal for retaining fluid in the tooth spaces of the gears. To assist in journaling the gears in the multi-section housing and to provide a seal for retaining the fluid in the tooth spaces of the gears at the other side, movable pressure-loaded bushings are provided which are indicated by the numerals 31. Each of the bushings 31 includes a generally tubular extension providing a bearing surface for journaling a corresponding gear shaft in the casing, and a radially extending flange portion providing a sealing face for engaging and sealing an adjoining gear side face and a rear pressure face spaced from an adjoining casing wall to provide a pressure control chamber 31a. Passage means are provided in bushings 31 to communicate the pressure chamber 31a with fluid at pressure generated by the pump, and preferably the passage may be extended through the radial flange of the movable bushings communicating the discharge side of each respective gear pump to the pressure chamber. Thus, it is seen that the bushings 31 are pressure loaded into sealing engagement with the gears.

An annular notch 32 is provided in each stationary and movable bushing at the intersection of the flange sealing face and the bearing face which communicates with a passage leading to a source of fluid pressure and an axial groove extends from the notch along the bearing face of the bushings to a point just short of the end of the bearing. This arrangement serves to provide adequate and proper cooling and lubrication for the bearing surfaces. Suitable resilient O-rings, such as indicated by the numerals 33 are provided throughout the housing to assist in sealing the various housing sections and the pumping chambers.

The centrifugal pump 19 includes a volute pumping chamber 34 and an impeller 35. The impeller is rigidly held on a forwardly extending stepped stub shaft 36a of a pinion gear 36 by a self-locking nut 37 received on the threaded end portion of the stub shaft 36a. Suitable means such as a key 38 secures the impeller to the stub shaft so that they may rotate in unison.

An intermediate enlarged shaft section 36b connects the pinion gear proper 36 to the stub shaft 36a and provides a bearing support for the impeller and gear in engaging a pair of bearing sleeves 39, the latter being held by the casing section 10. A thrust washer 40 spaces the impeller 35 from the outer bearing 39 and the shaft section 36b, while a thrust washer 41 is disposed between the inner bearing sleeve 39 and the pinion gear 36. While not shown, shims may be provided on either side of thrust washer 40 for adjustability purposes. The pinion gear 36 is then additionally supported by a diametrically reduced stub shaft 23c extending forwardly from the stub shaft 23a of the driven gear 23.

The centrifugal pump 19 and the pressure loaded gear pumps 16, 17 and 18 are powered through a common drive means, indicated generally by the numeral 42 which includes generally a pair of coaxially aligned and spaced shafts, one being a driving shaft as indicated by the numeral 43 and the other being a driven shaft as indicated by the numeral 44.

The input end of the driving shaft 43 is enlarged and splined to a driving collar 45, as indicated by the numeral 46. At the peripheral face of the driving collar, an outwardly extending radial thrust flange 47 having a beveled circumferential edge bearingly engages an annular thrust bearing 48 having a complementally formed beveled edge. The bearing member 48 is received in an annular notch of a cap member 49 attached to the end of the power input housing section 14 by a plurality of circumferentially spaced fasteners, such as fillister head screws as indicated by the numeral 49a on Figure 1. A pin 48a is received in the cap member 49 and a slotted section of the thrust bearing 48 to prevent relative movement between these elements. The driving collar 45 is externally splined to an enlarged rearwardly extending hub portion 50a of driving gear 50 as indicated by the numeral 51. The collar 45 also includes a hub 45a which in turn carries a coaxial and forward extending stub shaft portion 45b. The stub shaft portion 45b is also splined to a reduced hub portion 50b of gear 50 as indicated at 52. The outer free end of the stub shaft 45b threadingly receives a self-locking nut 53 which maintains the driving gear 50 on the driven collar 45. A shaft sealing structure 54 encircles the driven collar 45 and is maintained in position by a flange portion on the cap or retaining member 49 and an annular shoulder on the thrust flange 47. Details of construction of the seal are not believed to be necessary to the understanding of the principles of the present invention.

A helical spring 55 is received within a hollow of the input end of shaft 43 to act against the shaft and the hub portion 45a of the driving collar 45 and maintain the thrust flange 47 in constant bearing contact with the thrust bearing 48, and maintain the sealing structure 54 in its proper position.

A frangible coupling member, generally indicated by the numeral 56, interconnects the driving collar 45 to the driving gear 29 of gear pump 18 and constitutes a sleeve or a collar which includes a power input section 56a externally splined to mate with an internal spline of the driving collar 45, an output end 56b externally splined to engage the internally splined shaft portion 29b of the driving gear 29, an enlarged shoulder section 56c cooperating with a recessed portion of the stub shaft 29b to limit the axial movement of the coupling 56 along the shaft 43, and a reduced shear neck or shear section 56d capable of yielding or fracturing upon a predetermined abnormal load being exerted on the pump 18. It is noted that the output end of the coupling member 56 is concentric with and snugly encircles the shaft 43 and provides bearing support for the shaft through the splined engagement with the stub shaft 29b, and also the input end of the shaft 43 is supported through the spline connection with the driving collar and the thrust flange 47 and thrust bearing 48.

A second frangible coupling member 57 telescopically interlocks the driving shaft 43 to a second gear pump 17, and comprises a collar or sleeve wherein the input end 57a of the coupling is internally splined to external spline ribs along an intermediate section of the shaft 43. The output end 57b of the coupling is externally splined to internal spline ribs along the stub shaft 27b of the driving gear 27. Projecting annular shoulders are provided on the input and output end of the coupling to mate with complementally recessed shoulders of the stub shaft 29a of driving gear 29 and stub shaft 27b of driving gear 27, respectively, to limit the axial movement of the coupling 57 with respect to the shaft 43 and the driving gears 29 and 27. A frangible reduced shear neck or shear section 57c connects the input and output ends of the coupling and will fracture upon an abnormal load placed upon the pump 17 such as by binding, seizing, or otherwise.

The adjacent ends of the driving and driven shafts carry splined ribs which are interlocked through internally splined ribs of the input end 58a of a third frangible coupling member 58. The output end 58b of the coupling 58 carries external spline ribs interlocked with internal spline ribs of the stub shaft 24b of driving gear 24 in gear pump 16. Carried on the adjacent ends of the input and output ends of the coupling 58 are a pair of annular bearing pads 58c which respectively mate with enlarged bearing faces of the adjacent ends of driving gears 27 and 24 to provide a bearing support for the adjacent ends of the shafts 43 and 44, and limit axial movement of the coupling 58. A reduced shear neck section 58d connects the input and output ends of the frangible coupling 58, and will likewise fracture upon an abnormal load being placed on gear pump 16.

The driven shaft 44 extending through the hollow of driving gear 24 of pump 16 serves to drive the centrifugal pump impeller 35, and is provided with a reduced shear neck 44a adjacent the input end which will fracture if an abnormal load is placed upon the centrifugal pump impeller 35, without affecting in any manner the drive to the gear pumps. Adjacent the shear neck portion 44a is provided an enlarged annular projection 44b which coacts with the interior wall of the output end of coupling 58 if and when the shear neck portion 48a fractures to the support the then free end of the shaft 44.

Provided adjacent the output end of the shaft 44 are a plurality of longitudinal circumferentially spaced ribs which interlock with mating splined ribs of a beveled gear 59. The beveled gear 59 is retained on the end of the shaft 43 by a self-locking nut 60 abutting against a spacer 61, and is in meshing engagement with a beveled gear portion 62a of a combination bevel and spur gear 62. The combination gear 62 is rotatably journaled on a sleeve bearing 63, which, in turn, is supported by a nubbin 24c extending forwardly from the stub shaft 24a of driving gear 24. The combination gear 62 carries a spur gear portion 62b which meshes with the pinion gear 36 to drive the impeller 35. A spacer member 63 maintains the shaft 44 against outward axial movement by abutting against a radial flange on the shaft 44 on the inner face and a flange of the nubbin 24c on the outer face.

Figure 3:
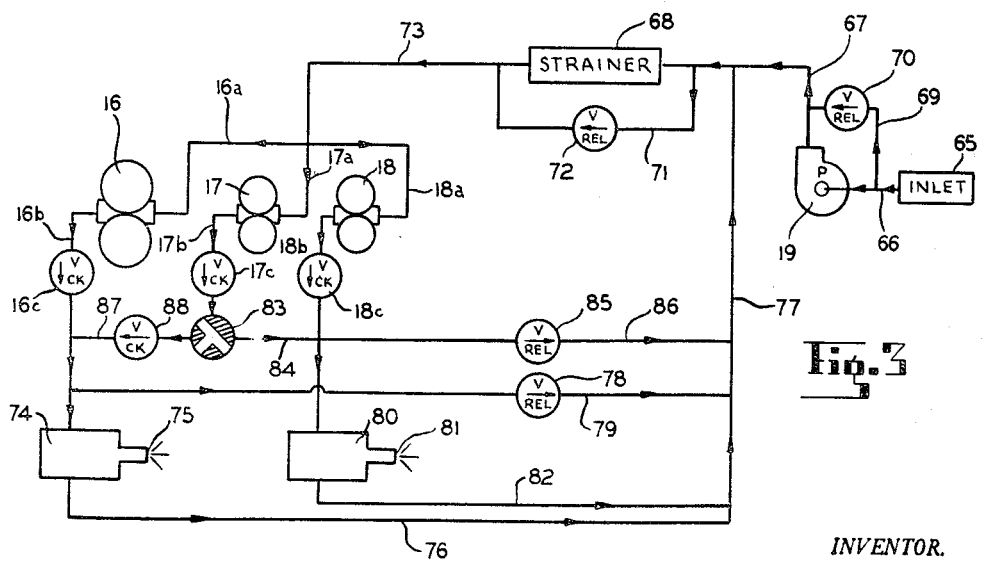
Figure 3 is a plumbing diagram of the pump in Figure 2 according to the invention.

For a clear understanding as to pumping relationship between the various pumps, a plumbing diagram is set forth in Figure 3 to show the fuel flow through the various pumping stages.

Fluid such as fuel is received at the inlet 65 from a fuel supply tank or container (not shown) and passes through a conduit or passage 66 to the centrifugal pump 19. From the discharge end of the centrifugal pump 19, a conduit 67 leads to a strainer 68. If the centrifugal pump 19 is clogged or stationary for any reason, the fuel flow may be diverted through a centrifugal pump bypass conduit 69 which is provided with a relief valve 70, the latter allowing the passage of fluid therethrough to by-pass the pump upon a predetermined resistance to fluid flow in the pump 19.

To guard against the discontinuance of fuel flow, wherein the strainer 68 may be clogged and rendered inefficient or inoperative, a strainer by-pass line 71 will allow the fuel flow to by-pass the strainer if a predetermined pressure is built up to actuate a relief valve 72 in the by-pass line 71.

From the strainer or by-pass line, a distribution conduit 73 leads to respective pump condits 16a, 17a and 18a of parallel connected pressure loaded gear pumps 16, 17 and 18. Each of the pumps are provided with discharge conduits 16b, 17b and 18b, respectively, which include non-return or check valves 16c, 17c and 18c, respectively. The check valves in the discharge conduits of the gear pumps preclude back-flow in the event of inoperativeness of any one of the pumps.

The discharge conduit 16b of the main gear pump 16 delivers the pressurized fuel to a main burner fuel flow control unit 74 to feed fuel to the main burner nozzles 75. A main burner by-pass passage 76 leads from the control unit 74 and ties in with a return conduit 77 which connects interstage the centrifugal pump 19 and the gear pumps at the conduit 67. To guard against excessive fuel pressure in the main burner control unit 74, a main burner relief valve 78 is provided in a by-pass conduit 79 which joins the discharge passage 16b of the gear pump to the return conduit 77.

The discharge passage 18b from the gear pump 18 leads directly to the afterburner fuel flow control unit 80 which delivers fuel to the afterburner nozzles 81. A by-pass passage 82 leads from the control unit 80 to the return conduit 77 to return the by-pass flow interstage the centrifugal pump and the gear pumps.

The discharge line 17b of the pump 17 leads to a three-way transfer valve 83 which in its normal position as shown in Figure 3 diverts the pressurized fuel to a tie-in conduit 84 connecting to the discharge conduit 18b of gear pump 18 and thereby feeding into the afterburner control unit 80. A relief valve 85 is provided in a by-pass conduit 86 which connects with the discharge passage 18b of pump 18 and the tie-in conduit 84 of pump 17 and the return passage 77 to protect the afterburner control unit 80 against excessive fuel pressures.

Upon the failure of main pump 16 such as by binding or seizing, the transfer valve 83 functioning automatically through the aid of the inlet and discharge pressures of the main pump 16 diverts the flow of pressurized fuel from pump 17 into the discharge conduit 16c of main pump 16 through a communicating passage 87. A check valve 88 is provided in the passage 87 to prevent return flow of fuel to the transfer valve 83.

Referring now generally to Figures 2 and 3, in operation, should the centrifugal pump 19 bind or seize the frangible neck portion 44a on the driven shaft 44 of the common drive means it would fracture to protect the pump and driving gear from damage, but allow the uninterrupted operation of the pressure loaded gear pumps 16, 17 and 18. As already explained, the fuel flow may by-pass the centrifugal pump through the conduit 69 if the resistance of flow through the pump actuates the pressure relief valve 70.

Upon a predetermined abnormal load on the main gear pump 16, such as if it were to bind or seize, the frangible coupling 58 would shear in the locale of the reduced shear neck 58d without interrupting the operation of the other pumps.

Should abnormal loading be exerted on the afterburner gear pumps 17 and 18, their respective frangible couplings 56 and 57 will yield selectively without interrupting the power delivery through the common drive means 42 to the remaining pumps. It is understood that adequate running clearance is provided between the shaft 43 and the output ends of the frangible couplings 56 and 57, that adequate running clearance is provided between the input ends of couplings 57 and 58 and the correspondingly encircling driving gear stub shafts, and that adequate clearance exists between the shaft enlargement 44b of shaft 44 and the output end of the frangible coupling 58.

In view of the above description, it is seen that applicant has provided a multiple pump apparatus, wherein several pumps are powered by common drive means, and wherein separate frangible means connects the common drive means to each pump so that upon abnormal loading of any one pump and the fracturing of its corresponding frangible means, there will be provided uninterrupted operation of the other pumps to continue deliverance of fuel supply.

It will be understood that modifications and variations may be effected without departing from the scope of the novel concepts of the present invention, but it is understood that the patent warranted hereon should embrace all of the modifications which reasonably and properly come within the scope of my contribution to the art.

I claim as my invention:

1. A multiple pump comprising a housing having an inlet and an outlet, a plurality of pressure loaded gear pumps in parallel, a centrifugal pump in series and ahead of said gear pumps, and a common drive means for said pumps including a pair of axially aligned shafts extending through the driving gears of said gear pumps, one of said shafts being a driver shaft while the other shaft constitutes a driven shaft, means connected to one end of said driver shaft for imparting power thereto, a sleeve member having one section locked to said last named means and another section locked to a gear pump, a second sleeve member connected to said driver shaft and a second gear pump, a third sleeve member having a section for transmitting power from the driver shaft to the driven shaft, and a section for transmitting power from said driver shaft to another gear pump, a gear train connected to the free end of the driven shaft for transmitting power to the centrifugal pump, and a reduced frangible portion in each of said sleeve members located between the respective connections to the corresponding gear pump and the drive shaft and on said driven shaft between its ends, whereby abnormal loading of any pump will fracture a frangible portion to discontinue operation of a corresponding pump.

2. A multiple pump comprising a casing having an inlet and an outlet, a plurality of longitudinally spaced coaxially aligned pumping cavities connected in parallel, intermeshing driving and driven gears in each cavity providing a plurality of pressure loaded gear pumps, a volute chamber in said casing connected in series with said pumping cavities, an impeller in said chamber and cooperating therewith to provide a centrifugal pump for delivering pressurized fluid to said gear pumps, a common drive for all said pumps including an externally splined stub shaft projecting from one end of the casing in coaxial alignment with the driving gears of said gear pumps, a collar on said stub shaft extending inwardly of said casing and being externally and internally splined, a driving member having an internally splined outwardly extending hub portion engaging said stub shaft and an internally splined inwardly extending hub portion in concentric engagement with said collar, a peripherally beveled radial flange on said collar coacting with a complementally beveled ring member to provide a thrust bearing, a first shaft extending through one driving gear and substantially another, said first shaft circumferentially splined at each end and intermediately thereof, the outer end being in splined engagement with said collar, a first sleeve coupling member surrounding the first shaft and externally splined at each end to connect the collar to the first driving gear and having a shear neck intermediate the ends thereof, a second sleeve coupling member surrounding said first shaft having an internally splined portion engaging the intermediate spline of the shaft and an externally splined portion separated from the internally splined portion by a shear section, said externally splined portion connecting to a second driving gear, a second shaft axially aligned and spaced from said first shaft and circumferentially splined at the end adjacent the first shaft, the other end of said second shaft being drivingly connected to said centrifugal pump, and a third coupling sleeve member having an internally splined section connecting the adjacent ends of said first and second shafts, an externally splined portion connecting to a third driving gear and being separated from said internally splined section by a shear section.

3. A multiple pump comprising a casing having an inlet and an outlet, a plurality of longitudinally spaced coaxially aligned pumping cavities connected in parallel, intermeshing driving and driven gears in each cavity providing a plurality of pressure loaded gear pumps, a volute chamber in said casing connected in series with said pumping cavities, an impeller in said chamber and cooperating therewith to provide a centrifugal pump for delivering pressurized fluid to said gear pumps, a common drive for all said pumps including axially aligned and spaced first and second shafts extending through said driving gears, means splinably connected to the input end of said first shaft and providing an internally splined portion inwardly thereof surrounding said first shaft, a coupling sleeve concentric to said first shaft connected at one end to said means and at the other end to the first driving gear, a second coupling sleeve connected at one end to an intermediate spline section of said first shaft and at the other end to a second driving gear, a third coupling sleeve connecting at one section the adjacent ends of the first and second shafts and at another section a third driving gear, gearing means drivingly connecting the free end of the second shaft to said centrifugal impeller, and a frangible section intermediate the ends of the second shaft, said first, second and third coupling sleeves each having a reduced shear neck formed therein between the respective ends connected to each respective gear and said first shaft to yield under abnormal load.

4. A multiple pump comprising a casing having an inlet and an outlet, a plurality of longitudinally spaced coaxially aligned pumping cavities connected in parallel, intermeshing driving and driven gears in each cavity providing a plurality of pressure loaded gear pumps, a volute chamber in said casing connected in series with said pumping cavities, an impeller in said chamber and cooperating therewith to provide a centrifugal pump for delivering pressurized fluid to said gear pumps, a common drive for all said pumps including a pair of axially aligned and spaced first and second shafts extending through the driving gears of said gear pumps, a collar splined to the outer end of the first shaft, a first cylindrical frangible coupling member surrounding said first shaft and having spaced splined sections connecting to the collar and a pump driving gear, respectively, said coupling member having a shearable section between the splined sections, a second cylindrical frangible coupling member having spaced sections splined to said first shaft and a second pump driving gear and a shearable section between said spline sections, a third cylindrical frangible coupling member having a splined section connecting said shafts, a splined section engaging a third pump driving gear, and a shearable section between said splined sections, and said second shaft having a frangible section and being connected to the centrifugal pump impeller.

5. In a multiple pump having three coaxially aligned pressure loaded gear pumps connected in parallel and a centrifugal pump connected in series to the gear pumps, each said gear pump including a driving gear intermeshing with a driven gear, a common drive for all said pumps comprising, a first shaft, a second shaft coaxially spaced and aligned to said first shaft, said shafts extending axially through the driving gears of said gear pumps, an internally splined coupling member splined to and interconnecting adjacent ends of said shafts, the output end of said second shaft being drivingly connected to the centrifugal pump, a driving collar splined to the input end of the first shaft, a first frangible coupling member externally splined at the input end to said collar and concentrically spaced from the driving shaft, and externally splined at the output end to the driving gear of the first gear pump and in concentric bearing engagement with said first shaft, said first frangible coupling member having a yieldable shear section intermediate the splined ends, a second frangible coupling member internally splined at the input end of said first shaft and externally splined at the output end to the driving gear of the second gear pump, a yieldable shear section formed intermediate the splined ends of said second frangible coupling member, an externally splined section connected to the driving gear of the third gear pump and to said internally splined coupling member by a yieldable shear section, said internally splined coupling member having an annular bearing pad coacting with said second and third driving gears to bearingly support the adjacent ends of said shafts, and a yieldable shear section in said second shaft, means on said second shaft cooperating with the internal bore of said externally splined section of the internally splined coupling member to support the free end of said shaft when the shearing section yields, and means on said first and second frangible coupling members and said coupling member to limit axial movement thereof with respect to the pump driving gears, whereupon any one of said shear sections selectively yields when a corresponding pump binds or seizes to permit uninterrupted operation of the other pumps.

References Cited in the file of this patent

UNITED STATES PATENTS

| | | |
|---|---|---|
| 724,684 | Edwards | Apr. 7, 1903 |
| 1,339,273 | Miller | May 4, 1920 |
| 1,646,427 | Skidmore | Oct. 25, 1927 |
| 1,941,061 | Thiry | Dec. 26, 1933 |
| 2,055,014 | Manger | Sept. 22, 1936 |
| 2,164,485 | Yantis | July 4, 1939 |
| 2,539,534 | Eckhardt | Jan. 20, 1951 |
| 2,665,637 | Lauck | Jan. 12, 1954 |
| 2,665,638 | Lauck | Jan. 12, 1954 |
| 2,699,724 | Murray et al. | Jan. 18, 1955 |
| 2,726,604 | Aspelin et al. | Dec. 13, 1955 |
| 2,749,778 | Kuhn | June 12, 1956 |
| 2,767,658 | Murray | Oct. 23, 1956 |
| 2,865,302 | Murray | Dec. 23, 1958 |
| 2,870,719 | Murray et al. | Jan. 27, 1959 |

FOREIGN PATENTS

| | | |
|---|---|---|
| 588,303 | Great Britain | May 20, 1947 |
| 993,467 | France | July 25, 1951 |